United States Patent
Yamada et al.

(10) Patent No.: US 9,755,483 B2
(45) Date of Patent: Sep. 5, 2017

(54) ROTOR FOR ROTATING ELECTRICAL MACHINE, AND ROTATING ELECTRICAL MACHINE PROVIDED WITH SAID ROTOR

(75) Inventors: Eiji Yamada, Owariasahi (JP); Kaoru Kubo, Nishikamo-gun (JP); Ryoji Mizutani, Nagoya (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 192 days.

(21) Appl. No.: 14/361,774

(22) PCT Filed: Dec. 1, 2011

(86) PCT No.: PCT/JP2011/077830
§ 371 (c)(1),
(2), (4) Date: May 30, 2014

(87) PCT Pub. No.: WO2013/080361
PCT Pub. Date: Jun. 6, 2013

(65) Prior Publication Data
US 2014/0300223 A1    Oct. 9, 2014

(51) Int. Cl.
*H02K 11/00* (2016.01)
*H02K 9/197* (2006.01)
(Continued)

(52) U.S. Cl.
CPC .................. *H02K 9/19* (2013.01); *H02K 1/24* (2013.01); *H02K 1/32* (2013.01); *H02K 3/24* (2013.01);
(Continued)

(58) Field of Classification Search
CPC .......... H02K 19/12; H02K 19/26; H02K 1/24; H02K 1/32; H02K 11/042; H02K 9/19;
(Continued)

(56) References Cited

U.S. PATENT DOCUMENTS 3,562,564 A * 2/1971 Potter ...................... H02K 9/19
                                                    310/54
3,733,503 A * 5/1973 Potter .................. H02K 11/042
                                                    310/54
(Continued)

FOREIGN PATENT DOCUMENTS

CN      201352730        * 11/2009
JP      37-029704 Y1       11/1962
(Continued)

OTHER PUBLICATIONS

CN 201352730 machine translation Aug. 22, 2016.*

*Primary Examiner* — Joshua Benitez-Rosario
*Assistant Examiner* — Leda Pham
(74) *Attorney, Agent, or Firm* — Andrews Kurth Kenyon LLP

(57) ABSTRACT

Provided is a rotating electrical machine wherein it is possible to sufficiently cool an electronic device attached to a rotor by means of a liquid refrigerant. A rotor for a rotating electrical machine is provided with a shaft supported in a rotatable manner, a rotor core secured to the shaft, an electronic device disposed so as to rotate along with the shaft and the rotor core, a coil wound around the rotor core and connected to the electronic device, and a cooling structure for sequentially cooling the electronic device and the coil by means of a liquid refrigerant supplied from the shaft.

5 Claims, 12 Drawing Sheets

(51) Int. Cl.
  *H02K 9/19* (2006.01)
  *H02K 3/24* (2006.01)
  *H02K 19/12* (2006.01)
  *H02K 19/26* (2006.01)
  *H02K 1/24* (2006.01)
  *H02K 11/042* (2016.01)
  *H02K 1/32* (2006.01)

(52) U.S. Cl.
  CPC ............ *H02K 11/042* (2013.01); *H02K 19/12* (2013.01); *H02K 19/26* (2013.01)

(58) Field of Classification Search
  CPC .......... H02K 3/24; H02K 5/18; H02K 11/068; H02K 9/197; H02K 17/26; H02K 1/28
  USPC ..................... 310/58, 59, 68 D, 54, 61, 60 A
  See application file for complete search history.

(56) References Cited

U.S. PATENT DOCUMENTS

| | | | | |
|---|---|---|---|---|
| 3,896,320 A | * | 7/1975 | Moffatt | H02K 9/19 310/64 |
| 4,161,668 A | * | 7/1979 | Schmohe | H02K 9/19 310/58 |
| 4,221,982 A | * | 9/1980 | Raver | H01L 25/115 257/E25.026 |
| 4,621,210 A | * | 11/1986 | Krinickas, Jr. | H02K 9/19 310/54 |
| 5,365,133 A | * | 11/1994 | Raad | H02K 11/042 310/54 |
| 6,218,747 B1 | | 4/2001 | Tsuruhara | |
| 6,727,609 B2 | * | 4/2004 | Johnsen | H02K 1/32 310/52 |
| 2002/0163274 A1 | | 11/2002 | Kusase et al. | |
| 2006/0268527 A1 | * | 11/2006 | Tanaka | H05K 1/0201 361/722 |
| 2007/0278872 A1 | * | 12/2007 | Elser | H02K 3/50 310/71 |
| 2008/0185933 A1 | * | 8/2008 | Baba | H02K 3/18 310/198 |
| 2010/0259136 A1 | * | 10/2010 | Hiramoto | H02K 1/223 310/68 D |

FOREIGN PATENT DOCUMENTS

| | | |
|---|---|---|
| JP | 58-186776 U | 12/1983 |
| JP | 5-029275 B2 | 4/1993 |
| JP | 2000-262013 A | 9/2000 |
| JP | 2003-023758 A | 1/2003 |
| JP | 2008-178211 A | 7/2008 |
| JP | 2010-279165 A | 12/2010 |
| JP | 2011-041433 A | 2/2011 |

\* cited by examiner

ROTOR FOR ROTATING ELECTRICAL MACHINE, AND ROTATING ELECTRICAL MACHINE PROVIDED WITH SAID ROTOR

CROSS-REFERENCE TO RELATED APPLICATIONS

This is a national phase application based on the PCT International Patent Application No. PCT/JP2011/077830 filed Dec. 1, 2011, the entire contents of which are incorporated herein by reference.

TECHNICAL FIELD

The present invention relates to a rotor for a rotating electrical machine, the rotor having a coil wound around the rotor, and a rotating electrical machine provided with the rotor.

BACKGROUND ART

Conventionally, JP 5-29275 U (Patent Document 1) discloses a brushless electric generator including an armature of a main exciter, a rotor of a sub exciter, and a rectifier, that are mounted to a cylindrical holder which is in turn attached to a rotating shaft, so that the armature, the rotor, and the rectifier can be mounted to the rotating shaft collectively.

Further, JP 2011-41433 A (Patent Document 2) describes a rotating electrical machine including a stator which generates a rotating magnetic field by allowing an AC current to flow through stator windings and a rotor including rotor windings arranged at a plurality of locations in the circumferential direction thereof, and diodes that rectify the current flowing through each rotor winding.

PRIOR ART DOCUMENT

Patent Documents

Patent Document 1: JP 5-29275 U
Patent Document 2: JP 2011-41433 A

DISCLOSURE OF THE INVENTION

Technical Problems

In rotating electrical machines such as a power generator and a motor described in Patent Documents 1 and 2, an electronic device such as a diode configured to rotate with a rotor generates heat when energized. It is therefore desirable to sufficiently cool the electronic device that is attached to the rotor with a liquid refrigerant in order to maintain performance of the electronic device.

However, when a liquid refrigerant is supplied to the electronic device on the rotating rotor from the direction of a stator disposed toward the outer diameter side so as to surround the rotor, there is a possibility that the electronic device cannot be cooled sufficiently due to a member holding the electronic device on the outer side in the radial direction and the centrifugal force of the rotor being an obstacle.

The present application is aimed at providing a rotating electrical machine in which an electronic device provided on a rotor can be cooled sufficiently with a liquid refrigerant.

Solution to Problems

In accordance with one aspect of the invention, a rotor for a rotating electrical machine includes: a shaft supported in a rotatable manner; a rotor core secured to the shaft; an electronic device disposed so as to rotate along with the shaft and the rotor core; a coil wound around the rotor core and connected to the electronic device; and a cooling structure configured to sequentially cool the electronic device and the coil in this order with a liquid refrigerant supplied from the shaft.

In the rotor for a rotating electrical machine according to the present invention, the cooling structure may include a refrigerant supply channel configured to supply the liquid refrigerant flowing in the shaft to the outside of the shaft, and the electronic device may be disposed toward an inner diameter side with respect to the coil.

Further, in the rotor for a rotating electrical machine according to the present invention, the rotor core may include a plurality of salient poles in an outer circumferential portion thereof, and the coil may include a common coil wound on an inner diameter side of the salient pole with respect to a radial direction of the rotor core for magnetizing the salient pole and an induction coil wound on an outer diameter side of the salient pole and also connected to the common coil for generating induced current in response to a change in a magnetic flux from the stator.

In this case, the common coil may be wound around an outer circumference of the induction coil so as to overlap the induction coil.

In accordance with another aspect of the invention, a rotor for a rotating electrical machine includes a shaft supported in a rotatable manner; a rotor core secured to the shaft; an electronic device disposed on one end surface in the axial direction of the rotor core so as to rotate along with the shaft and the rotor core; a coil wound around the rotor core and connected to the electronic device, the coil having a higher heat resistance temperature than a heat resistance temperature of the electronic device; and a cooling structure configured to cool the electronic device with a liquid refrigerant supplied from the shaft, and the liquid refrigerant flowing in a refrigerant channel within the shaft is supplied from one end portion side in the axial direction of the shaft on which the electronic device is disposed.

Further, a rotating electrical machine according to the present invention includes the rotor for a rotating electrical machine having any one of the structures described above and a stator disposed opposite the rotor to cause a rotating magnetic field to act on the rotor.

Advantageous Effects of Invention

According to the rotor for a rotating electrical machine and the rotating electrical machine provided with such a rotor of the present invention, an electronic device is first cooled by a liquid refrigerant supplied from a shaft, and a coil wound around the rotor is subsequently cooled. It is therefore possible to cool both the electronic device and the coil effectively with the liquid refrigerant supplied from the shaft. It is also possible to reduce malfunction and so on, caused by heating of the electronic device, with a liquid refrigerant which has been heated to a high temperature by the heal of the coil when the coil is cooled first.

BEST MODE FOR CARRYING OUT THE INVENTION

Figure 1:
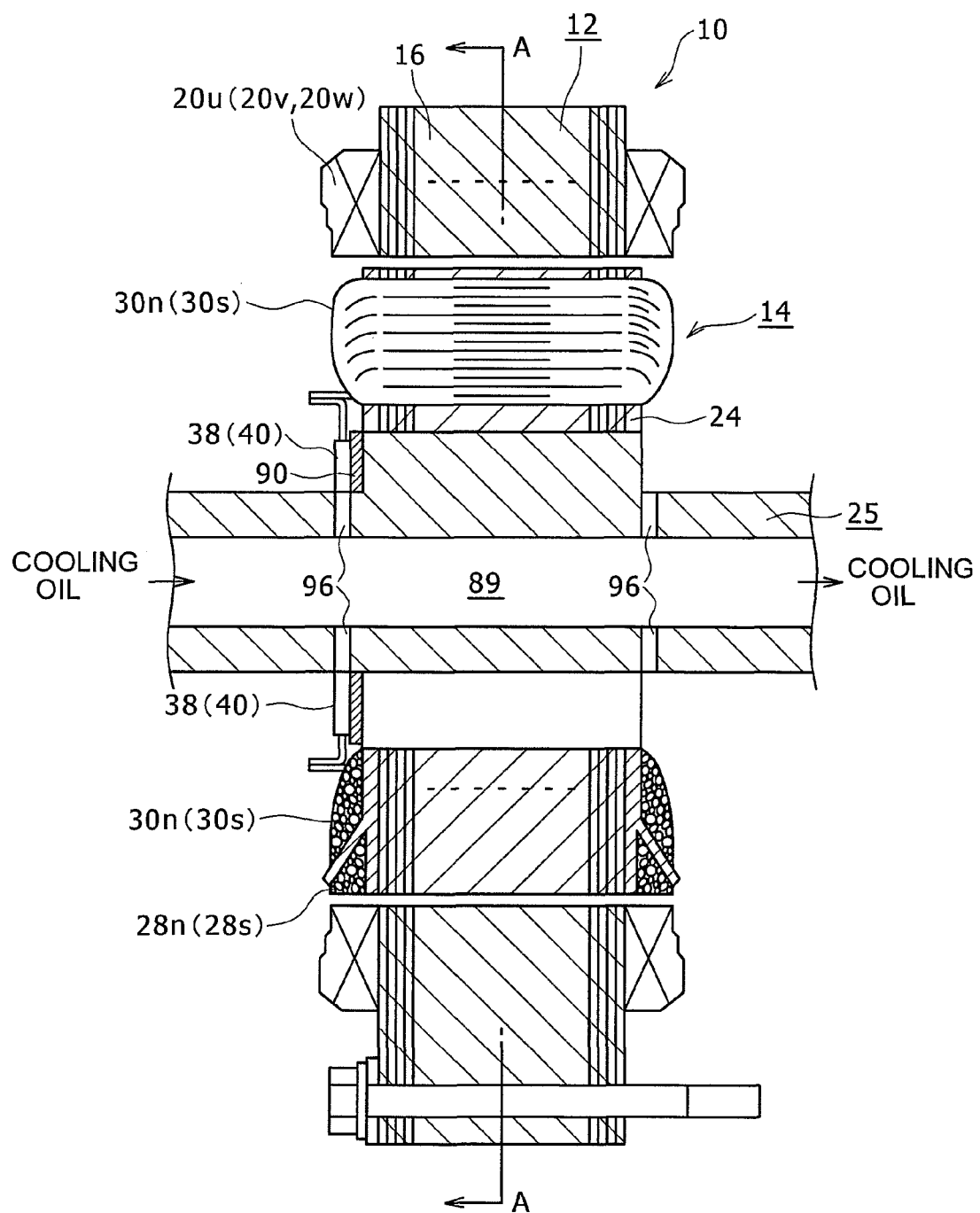
FIG. 1 Cross sectional view illustrating a rotating electrical machine according to an embodiment of the present invention.

A preferred embodiment of the present invention will be described with reference to the drawings. FIGS. 1 to 5, 7, and 8 are views illustrating an embodiment of the present invention. FIG. 1 is a cross sectional view schematically illustrating a portion of a rotating electrical machine including a rotor for a rotating electrical machine according to the present embodiment. As illustrated in FIG. 1, a rotating electrical machine 10, which functions as an electric motor or a power generator, includes a cylindrical stator 12 secured to a casing, which is not illustrated, and a rotor 14 disposed toward the inner side in the radial direction so as to oppose the stator 12 with a predetermined spacing being interposed therebetween and so as to be rotatable relative to the stator 12. The "radial direction" as used herein refers to the direction of radiation orthogonal to the rotation center axis of the rotor 14. (The meaning of the "radial direction" is identical, unless otherwise noted, throughout the whole specification and the claims of the present application).

The stator 12 includes a stator core 16 formed of a magnetic material and stator coils $20u$, $20v$, and $20w$ of a plurality of phases (e.g., three phases including U-phase, V-phase, and W-phase) provided on the stator core 16. The rotor 14 includes a rotor core 24 formed of a magnetic material and a shaft 25 inserted into a center portion of the rotor core 24 and fitted and secured thereto.

The rotor 14 also includes a plurality of rotor coils provided on the rotor core 24, including an N-pole induction coil $28n$, an S-pole induction coil $28s$, an N-pole common coil $30n$, and an S-pole common coil $30s$, a first diode 38 connected to the N-pole induction coil $28n$, and a second diode 40 connected to the S-pole induction pole $28s$. The rotor 14 may include two end plates provided on respective ends in the axial direction of the rotor core 24 so as to cover the coil ends of the coils $28n$, $28s$, $30n$, and $30s$, respectively.

Figure 2:
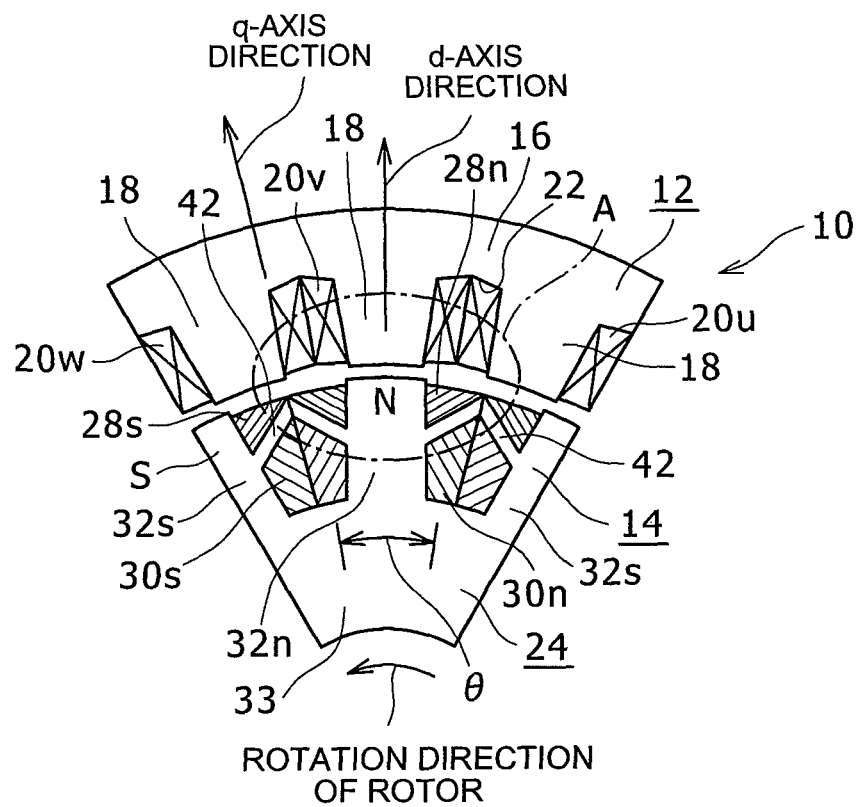
FIG. 2 Cross sectional view schematically illustrating a portion of a rotor and a stator in the circumferential direction in the rotating electrical machine according to the present embodiment.
Figure 3:
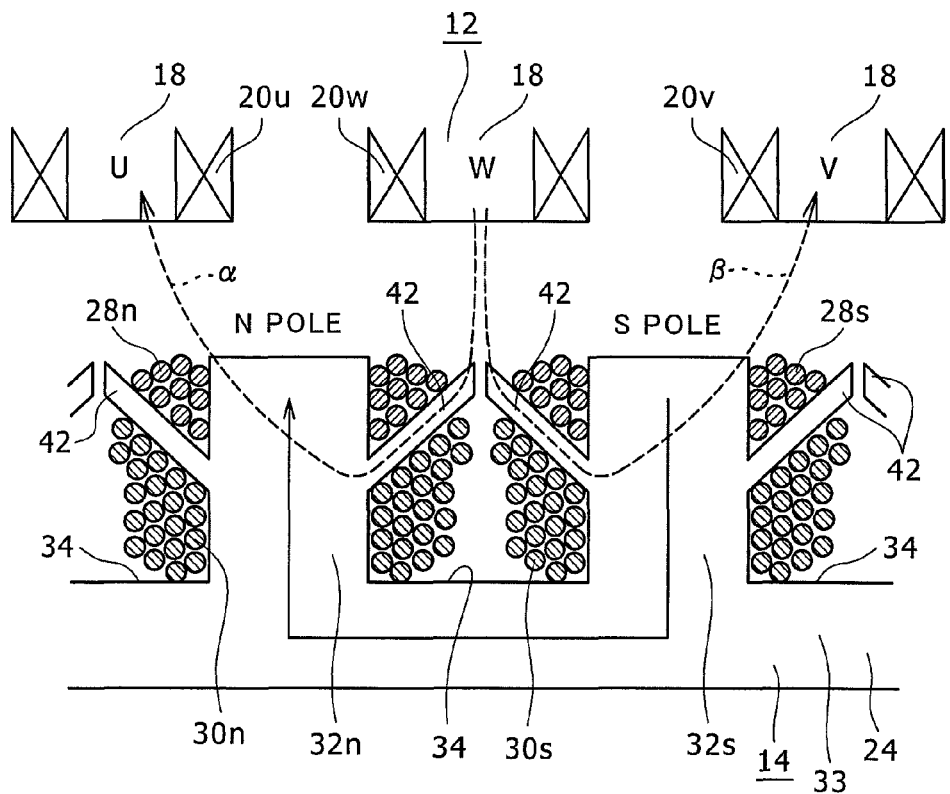
FIG. 3 Schematic view illustrating a state in which a magnetic flux generated by means of an induced current flowing through a rotor coil flows into the rotor.
Figure 4:
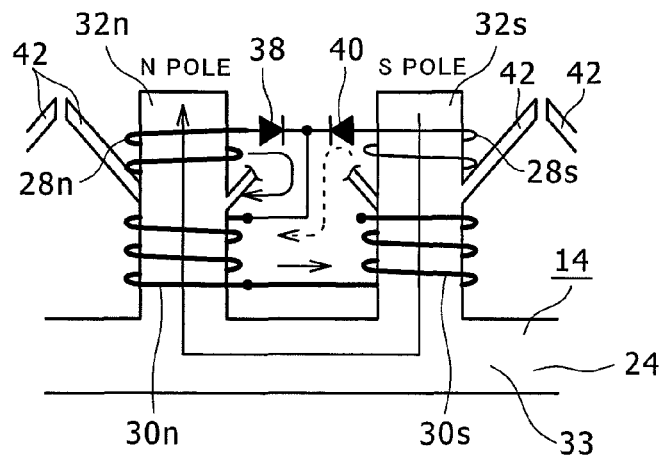
FIG. 4 View corresponding to FIG. 3, in which diodes are connected to the rotor coil.

The basic structure of the rotating electrical machine 10 will first be described with reference to FIGS. 2 to 5, and thereafter the detailed structure of the rotor 14 will be described. FIG. 2 is a cross sectional view schematically illustrating a portion of the rotor and the stator in the circumferential direction in the rotating electrical machine according to the present embodiment. FIG. 3 is a schematic view illustrating a state in which a magnetic flux generated by means of an induced current flowing through the rotor coil flows into the rotor. FIG. 4 is a view corresponding to FIG. 3, in which diodes are connected to the rotor coil.

As illustrated in FIG. 2, the stator 12 includes the stator core 16. The stator core 16 includes a plurality of teeth 18 projecting toward the inner side in the radial direction (i.e., toward the rotor 14), that are arranged at a plurality of locations in the circumferential direction of the inner circumferential surface of the stator core 16, and a slot 22 is formed between each pair of the teeth 18. The stator core 16 is formed of a magnetic material such as a laminate of metal sheets, such as magnetic steel sheets having magnetic properties, including silicon steel sheets, for example. The plurality of teeth 18 are arranged at equal intervals along the circumferential direction around the rotation center axis that is a rotation axis of the rotor 14. The "circumferential direction" as used herein refers to the direction along the circular shape drawn about the rotation center axis of the rotor 14. (The meaning of the "circumferential direction" is identical, unless otherwise noted, throughout the whole specification and the claims of the present application).

Each of the stator coils $20u$, $20v$, and $20w$ of respective phases is wound in a short-pitch concentrated winding around the tooth 18 of the stator core 16 through the slots 22. Thus, the stator coils $20u$, $20v$, and $20w$ are wound around the teeth 18 to form a magnetic pole. Further, by allowing alternating currents of a plurality of phases to flow in the stator coils $20u$, $20v$, and $20w$ of a plurality of phases, the teeth 18 arranged in the circumferential direction are magnetized so that a rotating magnetic field rotating in the circumferential direction can be generated in the stator 12.

It should be noted that the present invention is not limited to the structure in which the stator coils $20u$, $20v$, and $20w$ are wound around the teeth 18 of the stator 12 as described above, and it is also possible to wind the stator coils of a plurality of phases at a plurality of locations in the circumferential direction of an annular portion of the stator core 16 displaced from the teeth 18 to form a toroidal winding, so that a rotating magnetic field can be generated in the stator 12.

The rotating magnetic field formed in the teeth 18 acts on the rotor 14 from the leading end surface thereof. In the example illustrated in FIG. 2, three teeth 18 having the stator coils $20u$, $20v$, and $20w$ of three phases (U phase, V phase, and W phase) wound around these teeth 18, respectively, form a single pair of poles.

On the other hand, the rotor 14 includes the rotor core 24 formed of a magnetic material, and a plurality of rotor coils including an N-pole induction coil $28n$, an N-pole common coil $30n$, an S-pole induction coil $28s$, and an S-pole common coil $30s$. The rotor core 24 includes an N-pole forming salient pole $32n$ and an S-pole forming salient pole $32s$ which are a plurality of magnetic pole portions and are also main salient poles, provided so as to project toward the outward side in the radial direction at a plurality of locations in the circumferential direction of the outer circumferential surface (i.e. toward the stator 12).

The N-pole forming salient poles 32n and the S-pole forming salient poles 32s are alternately disposed along the circumferential direction of the rotor core 24 so as to be spaced from each other. Each of the salient poles 32n and 32s is opposite the stator 12. A rotor yoke 33, which is an annular portion of the rotor core 24, and the plurality of salient poles 32n and 32s are formed integrally by coupling a plurality of rotor core elements, that are laminates formed of a plurality of metal sheets made of a magnetic material, in an annular shape, as will be described in detail below. The N-pole forming salient pole 32n and the S-pole forming salient pole 32s are of the same shape and the same size.

More specifically, the N-pole common coil 30n and the N-pole induction coil 28n, which are two N-pole rotor coils, are wound, in a concentrated winding, around each of the N-pole forming salient poles 32n which appear every other pole around the circumferential direction of the rotor 14. Further, the S-pole common coil 30s and the S-pole induction coil 28s, which are two S-pole rotor coils, are wound, in a concentrated winding, around each of the S-pole forming salient poles 32s which are salient poles adjacent and separate from the N-pole forming salient poles 32n and which appear every other pole around the circumferential direction of the rotor 14. Concerning the radial direction of the rotor 14, the common coils 30n and 30s are inner side coils and the induction coils 28n and 28s are outer side coils.

As illustrated in FIG. 3, the rotor 14 includes slots 34 each being formed between a pair of the salient poles 32n and 32s that are adjacent in the circumferential direction. Specifically, the rotor core 24 includes a plurality of slots 34 formed at intervals in the circumferential direction about the rotation axis of the rotor 14. Further, the rotor core 24 is fitted and secured to the outer side in the radial direction of the shaft 25 (see FIG. 1) which is a rotation axis.

In each of the N-pole forming salient poles 32n, the N-pole induction coil 28n is wound toward the leading end side with respect to the N-pole common coil 30n, i.e., toward the side closer to the stator 12. In each of the S-pole forming salient poles 32s, the S-pole induction coil 28s is wound toward the leading end side with respect to the S-pole common coil 30s, i.e., toward the side closer to the stator 12.

As illustrated in FIG. 3, each of the induction coils 28n and 28s and the common coils 30n and 30s wound around each of the salient poles 32n and 32s can also be arranged in a regular winding by aligning a plurality of layers of solenoids provided along the length direction (vertical direction in FIG. 3) of the periphery of each salient pole 32n (or 32s) in the circumferential direction (horizontal direction in FIG. 3) of the salient pole 32n (or 32s). Also, the induction coils 28n and 28s wound toward the leading end side of the salient poles 32n and 32s, respectively, can alternatively be wound around the salient poles 32n and 32s, respectively, a plurality of times, i.e. a plurality of turns, in a spirally wound configuration.

Figure 5:
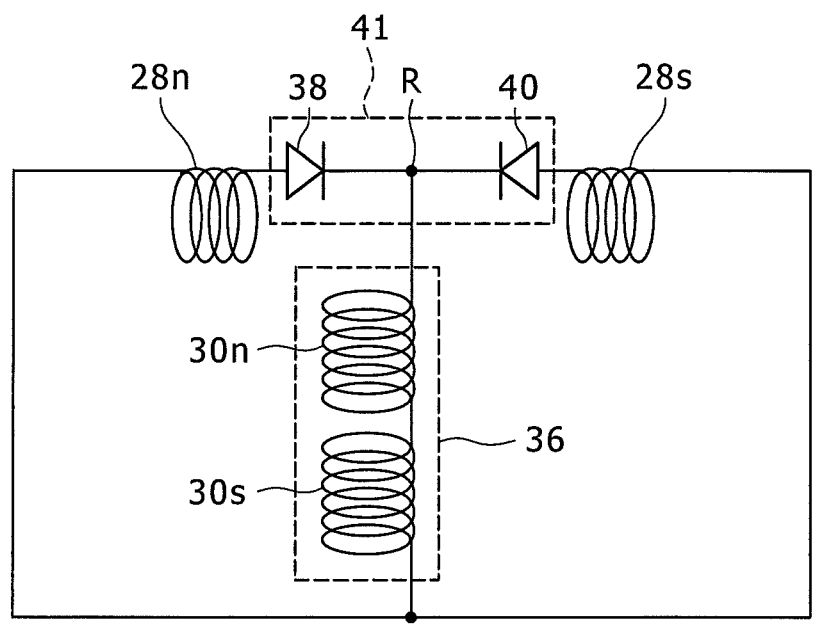
FIG. 5 View illustrating an equivalent circuit to a connection circuit of a plurality of coils wound around two salient poles adjacent in the circumferential direction of the rotor according to the present embodiment.

As illustrated in FIGS. 4 and 5, concerning each one set formed of two salient poles 32n and 32s adjacent in the circumferential direction of the rotor 14, one end of the N-pole induction coil 28n wound around the N-pole forming salient pole 32n and one end of the S-pole induction coil 28s wound around the S-pole forming salient pole 32s are connected with each other via a first diode 38 and a second diode 40 which are two electronic devices and are also rectification elements. FIG. 5 illustrates an equivalent circuit of a connect circuit of a plurality of coils 28n, 28s, 30n, and 30s wound around two salient poles 32n and 32s adjacent in the circumferential direction of the rotor 14 in the present embodiment. As illustrated in FIG. 5, one end of the N-pole induction coil 28n and one end of the S-pole induction coil 28s are connected at a connection point R via the first diode 38 and the second diode 40 having mutually opposite forward directions. In the present embodiment, as will be described below, a diode element 41 formed of the first and second diodes 38 and 40 which are integrally packaged by one resin mold package is used.

While, in the present embodiment, an example in which the electronic devices connected to the coils 28n, 28s, 30n, and 30s wound on the rotor core 24 are diodes will be described, the present invention is not limited to this example. Other rectifiers having a function of rectifying the electric current flowing in the coils (such as thyristors, transistors, and so on) may be used as the above-described electronic devices, or electronic devices such as a resistor and capacitor may be used in combination with a rectifier such as a diode.

As illustrated in FIGS. 4 and 5, in each set, one end of the N-pole common coil 30n wound around the N-pole forming salient pole 32n is connected with one end of the S-pole common coil 30s wound around the S-pole forming salient pole 32s. The N-pole common coil 30n and the S-pole common coil 30s are connected in series with each other to thereby form a common coil set 36. The other end of the N-pole common coil 30n is connected with the connection point R, and the other end of the S-pole common coil 30s is connected with the other end opposite the connection point R of the N-pole induction coil 28n and the S-pole induction coil 28s. Further, the winding center axis of each of the induction coils 28n and 28s and each of the common coils 30n and 30s matches the radial direction of the rotor 14 (FIG. 2). Each of the induction coils 28n and 28s and each of the common coils 30n and 30s can be wound around the corresponding salient poles 32n (or 32s) via an insulator (not shown) having electrical insulation properties formed of a resin or the like.

In the structure configured above, as will be described below, rectified electric currents flow in the N-pole induction coil 28n, the S-pole induction coil 28s, the N-pole common coil 30n, and the S-pole common coil 30s, so that the respective salient poles 32n and 32s are magnetized and function as a magnetic pole portion. Referring back to FIG. 3, while the stator 12 generates a rotating magnetic field by allowing the alternating current to flow in the stator coils 20u, 20v, and 20w, this rotating magnetic field contains not only the magnetic field of a fundamental component but also the magnetic field of a harmonic component having a higher order than that of the fundamental component.

More specifically, the distribution of the magnetomotive force which causes the stator 12 to generate the rotating magnetic field is not a sinusoidal distribution (made of only fundamental components) and includes harmonic components due to the arrangement of the stator coils 20u, 20v, and 20w of the respective phases and the shape of the stator core 16 by means of teeth 18 and the slots 22 (FIG. 2). In the concentrated winding, in particular, as the stator coils 20u, 20v, and 20w of the respective phases do not overlap each other, the amplitude level of the harmonic components generated in the distribution of the magnetomotive force of the stator 12 increases. When the stator coils 20u, 20v, and 20w are wound in a three-phase concentrated winding, the harmonic component contains a temporal third-order component of input electrical frequency and the amplitude level of the spatial second-order component increases. Such a harmonic component generated in the magnetomotive force due to the arrangement of the stator coils 20u, 20v, and 20w and the shape of the stator core 16 is referred to as a spatial harmonic wave.

When the rotating magnetic field containing this spatial harmonic wave component acts on the rotor 14 from the stator 12, due to a variation of magnetic flux of the spatial harmonic component, a variation of leakage flux leaking into a space between the salient poles 32n and 32s of the rotor 14 occurs, resulting in generation of an induced electromotive force in at least one of the induction coils 28n and 28s illustrated in FIG. 3.

The induction coils 28n and 28s on the leading end side of the salient poles 32n and 32s, that are closer to the stator 12, have a function of mainly generating induced current. On the other hand, the common coils 30n and 30s located farther from the stator 12 have a function of mainly magnetizing the salient poles 32n and 32s. Further, as can be understood from the equivalent circuit illustrated in FIG. 5, the total amount of currents flowing in the induction coils 28n and 28s wound around the adjacent salient poles 32n and 32s (see FIGS. 2 to 4) flows in each of the common coils 30n and 30s. As the adjacent common coils 30n and 30s are connected in series with each other, the same advantage as that obtained when the number of windings is increased can be achieved by these common coils 30n and 30s, so that the current flowing in each of the common coils 30n and 30s can be reduced while maintaining the magnetic flux flowing in each of the salient poles 32n and 32s.

When the induced electromotive force is generated in each of the induction coils 28n and 28s, the direct current in accordance with the rectifying direction of the diodes 38 and 40 flows in the N-pole induction coil 28n, the S-pole induction coil 28n, the N-pole common coil 30n, and the S-pole common coil 30s, and the salient poles 32n and 32s around which the common coils 30n and 30s are wound are magnetized, so that the salient poles 32n and 32s function as magnetic pole portions which are electromagnets having fixed magnetic poles.

As illustrated in FIG. 4, the N-pole induction coil 28n and the S-pole induction coil 28s, which are adjacent to each other in the circumferential direction, and the N-pole common coil 30n and the S-pole common coil 30s, which are adjacent to each other in the circumferential direction, are wound in opposite directions, so that the magnetization directions of the salient poles 32n and 32s which are adjacent to each other in the circumferential direction are opposite to each other. In the illustrated example, an N pole is generated at the tip end of the salient pole 32n around which the N-pole induction coil 28n and the N-pole common coil 30n are wound, and an S pole is generated at the tip end of the salient pole 32s around which the S-pole induction coil 28s and the S-pole common coil 30s are wound. Consequently, the N poles and the S poles are arranged alternately in the circumferential direction of the rotor 14. More specifically, the rotor 14 is configured such that the N poles and the S poles are arranged alternately in the circumferential direction by linkage of the harmonic components contained in the magnetic field generated by the stator 12.

In the present embodiment, the rotor 14 includes auxiliary salient poles 42 projecting from both sides in the circumferential direction of each of the salient poles 32n and 32s disposed at a plurality of locations in the circumferential direction. The auxiliary salient pole 42 is a plate-like magnetic body projecting from a plurality of locations in the axial direction (i.e. the direction perpendicular to a plane of FIGS. 3 and 4) on both sides in the circumferential direction of each of the salient poles 32n and 32s (i.e. the horizontal direction in FIGS. 3 and 4) in directions slanted with respect to the circumferential direction. In the illustrated example, for example, the auxiliary salient pole 42 is slanted with respect to the circumferential direction such that the auxiliary salient pole 42 is located toward the external side in the radial direction of the rotor 14 at a location toward the tip end of the auxiliary salient pole 42 at the intermediate portion in the radial direction on both sides in the circumferential direction of each salient pole 32n, 32s. The plurality of auxiliary salient poles 42 project from between the N-pole induction coil 28n and the N-pole common coil 30n and between the S-pole induction coil 28s and the S-pole common coil 30s on both sides of the salient poles 32n and 32s in the circumferential direction. Thus, the auxiliary salient poles 42 are magnetically connected with the corresponding salient poles 32n and 32s, respectively, on the base portion.

Further, a plurality of auxiliary salient poles 42 located within the same slot 34 and projecting from distinct opposing salient poles 32n and 32s may be mechanically coupled with each other or may not be mechanically coupled with each other. FIGS. 3 and 4 illustrate that the auxiliary salient pole 42 of the N-pole forming salient pole 32n and the auxiliary salient pole 42 of the S-pole forming salient pole 32s, which are disposed within the same slot 34, are not mechanically coupled with each other and are therefore magnetically decoupled from each other. Such auxiliary salient poles 42 are formed of the same magnetic material as that of the salient poles 32n and 32s.

The induction coil 28n (or 28s) and the common coil 30n (or 30s) wound around each salient pole 32n (or 32s) are partitioned and separated from each other by the auxiliary pole 42 within the corresponding slot 34. The induction coils 28n, 28s and the common coil 30n, 30s wound around the same salient pole 32n, 32s are connected with each other at a portion displaced from the auxiliary salient pole 42, for example, at one or both of the coil end sides, not illustrated, provided toward the outer side with respect to the end surface in the axial direction of the rotor core 24.

As will be described below with reference to FIG. 7, it is possible to form a flange portion 44 projecting on both sides in the circumferential direction of each salient pole 32n (and also 32s) at the tip portion thereof so as to prevent removal of the induction coil 28n, 28s. However, this flange portion 44 can be omitted.

In the rotating electrical machine 10 (FIG. 2) including such a rotor 14, by causing three-phase alternating currents to flow through the three-phase stator coils 20u, 20v, and 20w, the rotating magnetic field (fundamental wave component) formed in the teeth 18 (FIG. 2) acts on the rotor 14, and accordingly, the salient poles 32n and 32s are attracted to the rotating magnetic field of the teeth 18 such that the magnetic resistance of the rotor 14 becomes lower. Consequently, a torque (reluctance torque) acts on the rotor 14.

Further, when the rotating magnetic field containing the spatial harmonic components formed in the teeth 18 links with each of the induction coils 28n and 28s of the rotor 14, an induced electromotive force is generated at each of the induction coils 28n and 28s due to a change in the magnetic flux at frequencies different from the rotation frequency (fundamental wave component of the rotating magnetic field) of the rotor caused by the spatial harmonic components. With the generation of this induced electromotive force, the electric current flowing in each of the induction coils 28n and 28s is rectified by each of the diodes 38 and 40 into one direction (direct current).

With the magnetization of each of the salient poles 32n and 32s in accordance with flow of the direct current rectified by each of the diodes 38 and 40 in each of the induction coils 28n and 28s and each of the common coils 30n and 30s, each of the salient poles 32n and 32s functions as a magnet having a magnetic pole fixed (to one of N pole and S pole). As the rectifying directions of the electric currents of the induction coils 28n and 28s by the diodes 38 and 40 are opposite, as described above, the magnets generated in the salient poles 32n and 32a alternately have N pole and S pole in the circumference direction.

In addition, as illustrated in FIG. 3, the auxiliary salient poles 42 are formed on both sides in the circumferential direction of each of the salient poles 32n and 32s in the slant direction with respect to the circumferential direction such that the auxiliary salient pole 42 is located toward the outer side in the radial direction at a portion thereof toward the tip end. Accordingly, considering a case in which a q-axis magnetic flux, which is a magnetic flux of the spatially secondary spatial harmonic, flows, as a magnetomotive force of the stator 12, from the stator 12 to the rotor 14 in the directions indicated by broken arrows α and β in FIG. 3, for example, it is possible to allow a large amount of magnetic flux to be linked with the induction coils 28n and 28s due to the auxiliary salient poles 42. Specifically, as there are cases in which, due to a certain phase relationship between the stator 12 and the rotor 14, a large amount of q-axis magnetic flux of the spatial harmonics is induced into a part of the salient poles 32n and 32s via a part of the auxiliary salient poles 42 from a part of the teeth 18 of the stator 12 and from the part of the saline poles 32n and 32s to another tooth 18, it is possible to allow a large amount of magnetic flux to be linked with the induction coils 28n and 28s.

The direction and magnitude of q-axis magnetic flux vary during one electrical cycle, and with the increase of the maximum quantity of the magnetic flux flowing in the induction coils 28n and 28s, a variation of the linkage magnetic flux of the inductions coils 28n and 28s can be made great. For example, in a case in which the q-axis magnetic flux tends to flow in the S-pole forming salient pole 32s via the S-pole auxiliary salient pole 42 from the tooth 18 of the stator 12 as indicated by broken arrow β in FIG. 3, the magnetic flux tends to flow in such a direction as to turn the S-pole forming salient pole 32s into an N pole. In this case, induced current tends to flow in the S-pole induction coils 28s in the direction which interrupts this flow, and this flow of the induced current is not interrupted by the second diode 40 (see FIG. 4). Accordingly, as indicated by solid line arrow in FIG. 3, the magnetic flux caused by the induced current, which is a magnetic flux in the direction from the S-pole forming salient pole 32s to the N-pole forming salient pole 32n via the rotor yoke 33 of the rotor core 24, flows.

Conversely, there is also a case in which the q-axis magnetic flux tends to flow from the tooth 18 of the stator 12 into the auxiliary salient pole 42 via the N-pole forming salient pole 32n in the direction opposite to the broken arrow α in FIG. 3, and in this case the magnetic flux tends to flow in such a direction that turns the N-pole forming salient pole 32n into an S pole. In this case, induced current tends to flow in the N-pole induction coils 28n in the direction which interrupts this flow, and this flow of the induced current is not interrupted by the first diode 38 (see FIG. 4) and causes electric current to flow in the direction in which the N-pole forming salient pole 32n is an N pole. In this case, as in the above case, the magnetic flux caused by induced current, which is a magnetic flux in the direction from the S-pole forming salient pole 32s to the N-pole forming salient pole 32n via the rotor yoke 33 of the rotor core 24, flows. As a result, each of the salient poles 32n and 32s is magnetized to an N pole or an S pole.

As described above, as the auxiliary salient poles 42 project from both sides of each of the salient poles 32n and 32s, when compared to a case where no auxiliary salient poles 42 are formed, i.e. where only a space is formed in each slot 34 between the salient poles 32n and 32s adjacent to each other in the circumference direction, the maximum value of the amplitude of the linkage magnetic flux of each of the induction coils 28n and 28s can be increased, so that a variation of the linkage magnetic flux can be increased.

With an interaction of the magnetic field of each of the salient poles 32n and 32s (magnet having a fixed magnetic pole) with the rotating magnetic field (fundamental components) generated by the stator 12, attraction and repulsion actions occur. It is also possible to cause the torque (torque corresponding to a magnet torque) to act on the rotor 14 with the electromagnetic interaction (attraction and repulsion actions) of this rotating magnetic field (fundamental components) generated by the stator 12 with the magnetic field of the salient poles 32n and 32s, so that the rotor 14 is driven to rotate in synchronization with the rotating magnetic field (fundamental components) generated by the stator 12. Thus, it is possible to make the rotating electrical machine 10 function as a motor which generates power (mechanical power) in the rotor 14 by using the electric power supplied to the stator coils 20u, 20v, and 20w.

Figure 6:
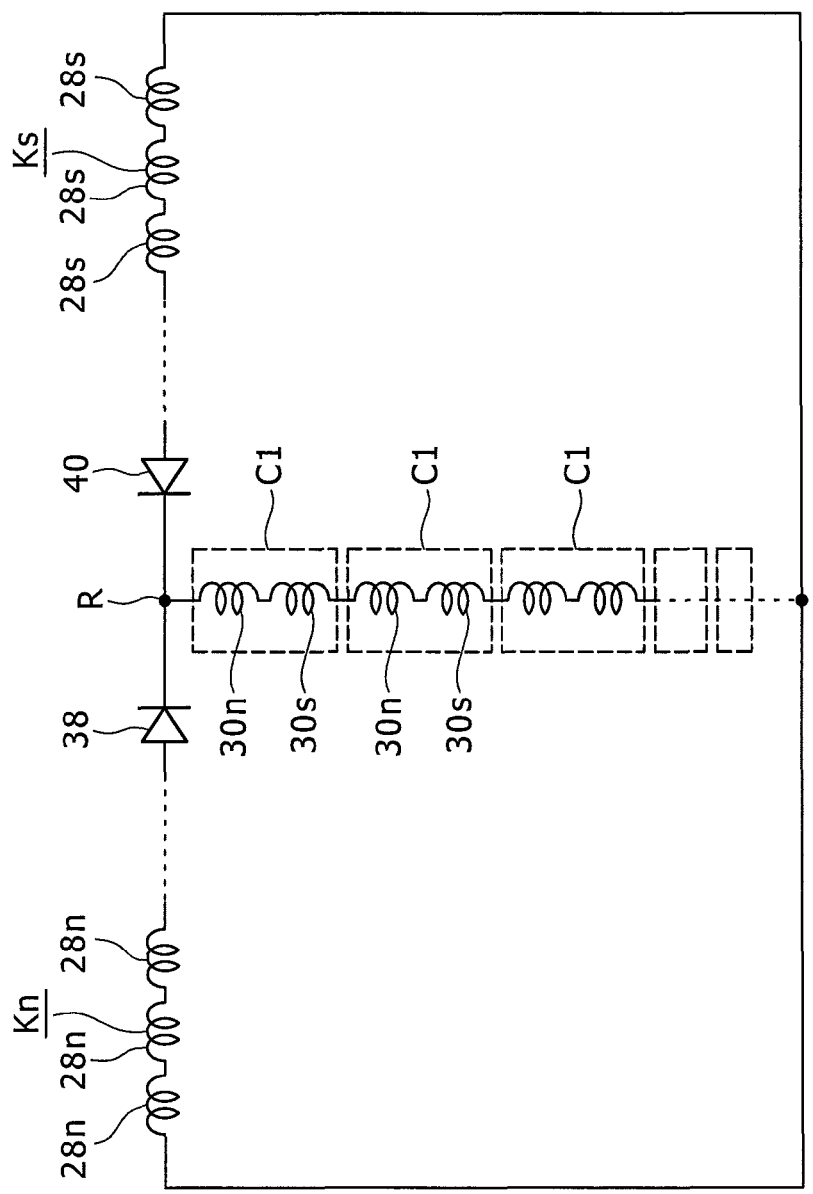
FIG. 6 View corresponding to FIG. 5 illustrating an example in which the number of diodes connected to the rotor coils is reduced.

In the present embodiment, an example in which, in each one set including two adjacent salient poles 32n and 32s, the induction coils 28n and 28s wound around the salient poles 32n and 32s, respectively, are connected with each other via the two diodes 38 and 40, has been described. In this case, two diodes 38 and 40 are necessary for two salient poles 32n and 32s. On the other hand, it is also possible to connect all the coils 28n and 28s, and 30n and 30s, wound around all the salient poles 32n and 32s of the rotor 14, respectively, while using only two diodes 38 and 40. FIG. 6 is a view corresponding to FIG. 5, which illustrates a modification example in which the number of diodes connected to the rotor coils is reduced.

In the modification example illustrated in FIG. 6, in the structure illustrated in FIGS. 3 and 4, a plurality of N-pole induction coils 28n wound around the tip end side of all of the N-pole forming salient poles 32n (see FIG. 3), which are provided at every other salient pole in the circumferential direction of the rotor, are connected in series with each other to form an N-pole induction coil set Kn, and a plurality of S-pole induction coils 28s wound around the tip end side of all of the S-pole forming salient poles 32s (see FIG. 3), which are provided adjacent to the N-pole forming salient poles 32n in the rotor, are connected in series with each other to form an S-pole induction coil set Ks. One end of the N-pole induction coils set Kn and one end of the S-pole induction coil set Ks are connected at a connection point R via the first diode 38 and the second diode 40 having opposite forward directions.

In each one set of the N-pole forming salient pole 32n and the S-pole forming salient pole 32s (see FIG. 3) that are adjacent to each other in the circumferential direction of the rotor, the N-pole common coils 32n and the S-pole common coils 30s are connected in series with each other to form a common coil set C1, and all the common coil sets C1 of all the salient poles 32n and 32s are connected in series with each other. In addition, for the plurality of common coil sets C1 connected in series, one end of the N-pole common coil 30n of one common coil set C1 at one end of the plurality of common coil sets C1 is connected to the connection point R, and one end of the S-pole common coil 30s of another common coil set C1 at the other end of the plurality of common coil sets C1 is connected to respective ends of the N-pole induction coil set Kn and the S-pole induction coil set Kn that are not connected to the connection point R. With this structure, contrary to the structure illustrated in FIGS. 4 and 5, the total number of diodes provided on the rotor can be reduced to two, i.e. the first diode 38 and the second diode 40, so that a reduction in the costs and in the number of assembling steps can be achieved.

The basic structure and the operation of the rotating electrical machine 10 including the rotor 14 according to the present embodiment have been described above. According to the present embodiment, the rotor 14 adopts a structure including a plurality of rotor core elements arranged in a plurality of locations in the circumferential direction, and further adopts the following specific structure in order to reduce magnetic resistance in the magnetic path through which a large amount of magnetic flux generated in the stator 12 passes, and to increase the performance of the rotating electrical machine 10. The specific structure of the rotor 14 will be described with reference to FIGS. 7 and 8 in which elements which are identical with or correspond to the elements described with reference to FIGS. 1 to 6 are denoted by the same numerical references.

Figure 7:
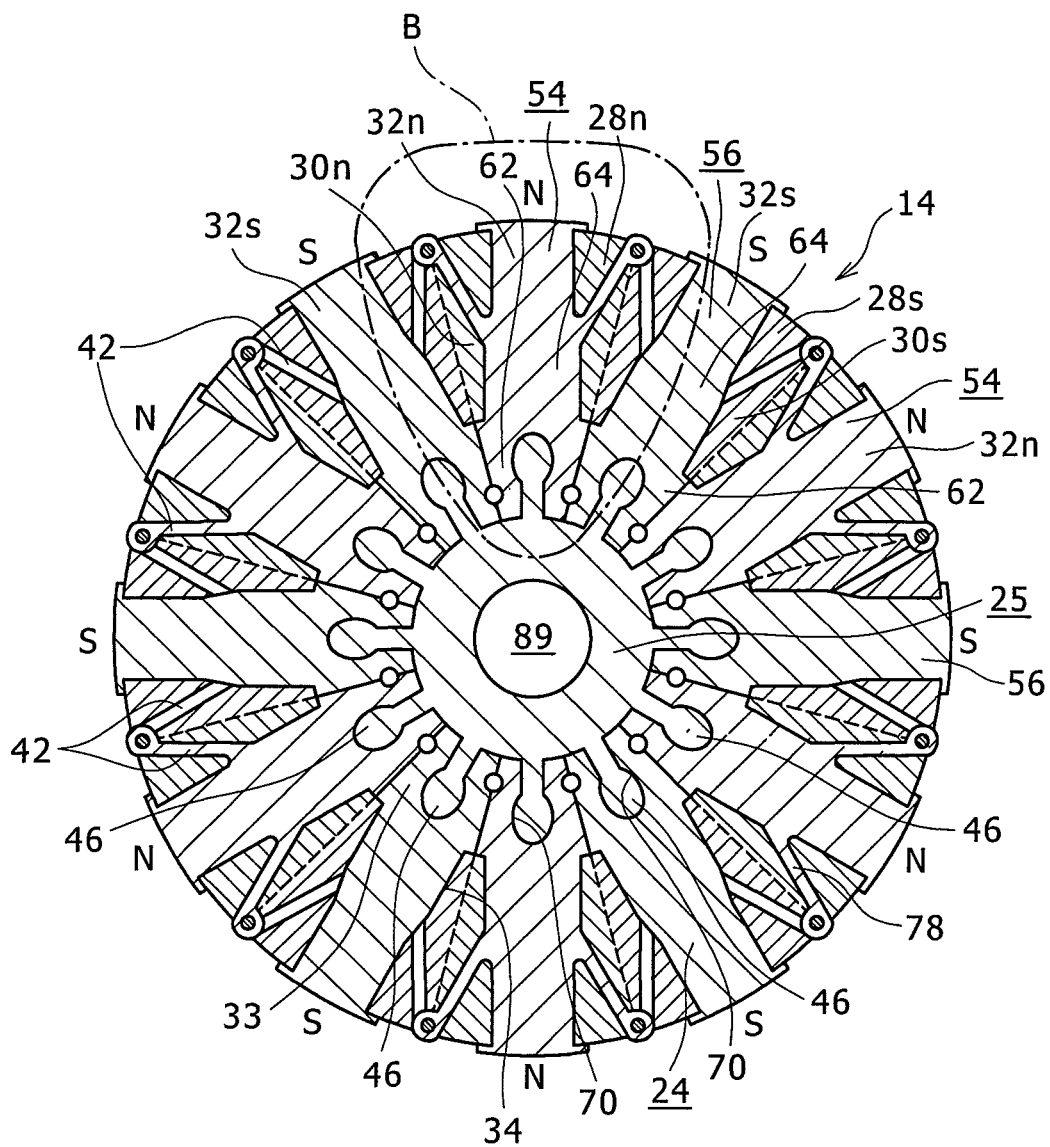
FIG. 7 Cross sectional view taken along line A-A of the rotor illustrated in FIG. 1.
Figure 8:
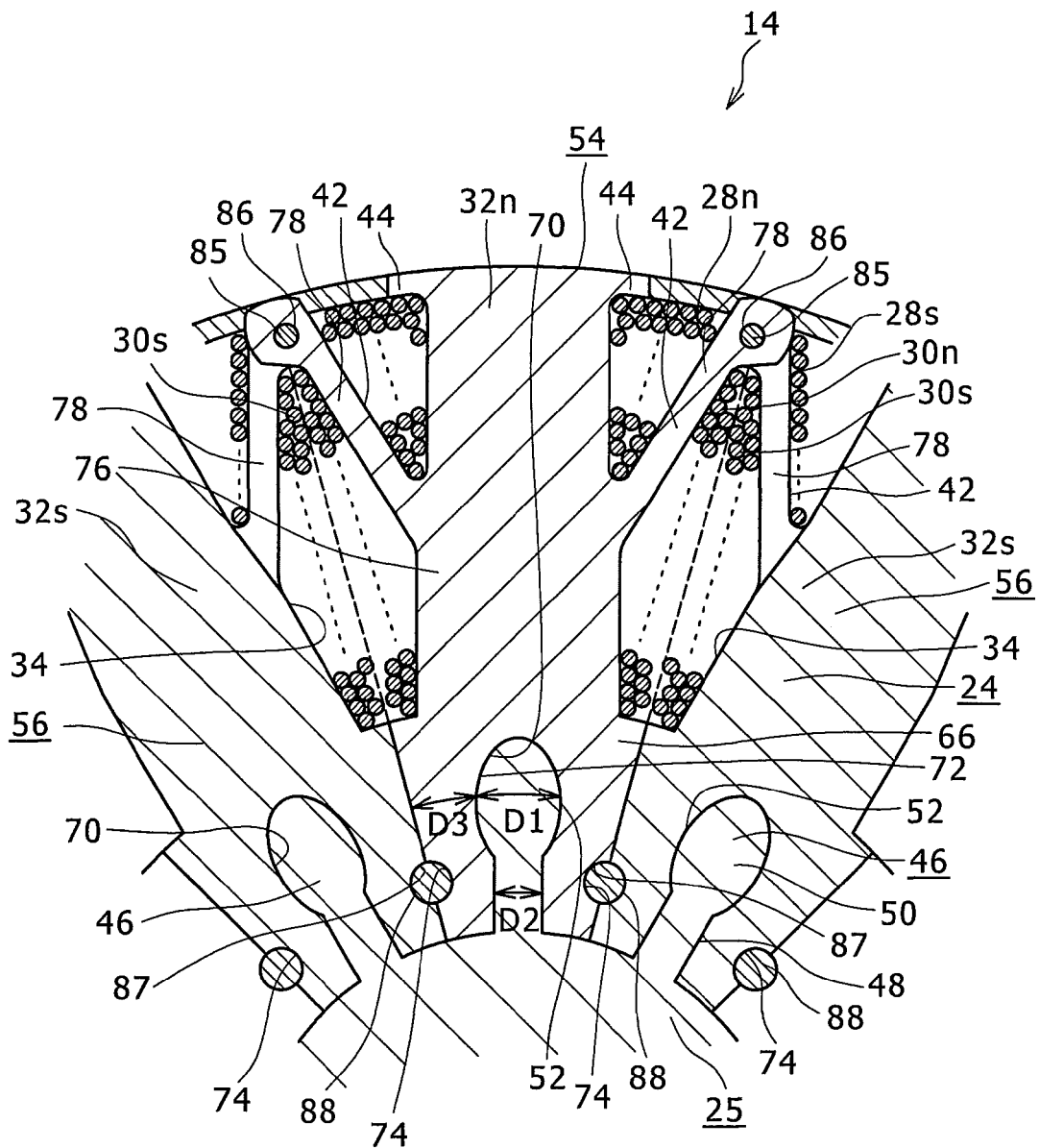
FIG. 8 Enlarged view of a portion B in FIG. 7.

FIG. 7 is a cross sectional view taken along A-A line of the rotor 14 illustrated in FIG. 1, and FIG. 8 is an enlarged view of the portion B in FIG. 7. As illustrated in FIG. 7, the rotor 14 of the present embodiment includes the rotor core 24 and the shaft 25 fitted and fixed to the center portion of the rotor core 24.

The shaft 25 includes a plurality of outward projection portions 46 provided at a plurality of locations in the circumferential direction on the outer circumferential surface thereof and projecting in the radiation directions. As illustrated in FIG. 8, each of the outward projection portions 46 has a shape elongated in the axial direction having the same cross sectional shape in a plane which is orthogonal to the axial direction as a whole. Each outer projection portion 46 includes a shaft side base portion 48 having a small width in the circumferential direction and a shaft side tip portion 50 coupling with the shaft side base portion 48 and having a larger width in the circumferential direction than the width in the circumferential direction of the shaft side base portion 48. The shaft side tip portion 50 has a substantially elliptical sectional shape. The shaft side tip portion 50 includes a maximum width portion 52 having the maximum width D1 in the circumferential direction, and the width D1 in the circumferential direction of the maximum width portion 52 is larger than the maximum width D2 in the circumferential direction of the shaft side base portion 48. The shaft 25 is formed of a material having a high rigidity such as a steel material which does not contain silicon.

Referring back to FIG. 7, the rotor core 24 includes first core elements 54 and second core elements 56, each being a plurality of rotor core elements. The rotor core 24 is formed by arranging each of the first core elements 54 and each of the second core elements 56 alternately in the circumferential direction and coupling the first core elements 54 and the second core elements 56 in an annular shape.

Each of the core elements 54 and 56 is formed of a laminate of magnetic plates such as an electromagnetic steel plate including a silicon steel plate and the like. Further, each of the core elements 54 and 56 includes a rotor side base portion 62 provided on the coupling side with respect to the shaft 25 and a rotor side tip portion 64 connected to the radially outer side of the rotor side base portion 62. The rotor side base portion 62 forms a rotor yoke 33 and the rotor side tip portion 64 forms the N-pole forming salient pole 32n or the S-pole forming salient pole 32s.

The rotor side base portion 62 includes an inward recess portion 70 which is recessed toward the outer side in the radial direction. The outward projection portion 46 provided on the shaft 25 is fitted in the inward recess portion 70. Each of the inward recess portions 70 is formed so as to open to the inner end in the radial direction of each of the core elements 54 and 56 and has a wide width portion 72 having a width which is increased in the circumferential direction at the back portion. The two side surfaces in the circumferential direction of the rotor side base portion 62 correspond to the radial direction of the rotor 14. The two side surfaces in the circumferential direction of the rotor side base portion 62 include a semicircle portion 74 at a radially inward portion with respect to the portion of the inward recess portion 70 having the maximum width in the circumferential direction.

Further, the rotor side tip portion 64 includes slant projection portions 78 projecting from both side surfaces thereof in the circumferential direction toward the directions slanted with respect to the circumferential direction. Each of the slant projection portions 78 forms the auxiliary salient pole 42 (see FIG. 2 and other drawings) described above. Each slant projection portion 78 includes a pin hole 85 formed at the tip portion thereof so as to penetrate the slant projection portion 78 in the axial direction. The rotor side tip portion 64 includes, on both side surfaces at the tip portion thereof in the circumferential direction, circumferential direction projection portions 80 for forming flange portions 44 (see FIG. 8), respectively.

In each of the core elements 54 and 56, the induction coil 28n (or 28s) is wound on the outer diameter side of the slant salient pole portion 78 and the common coil 30n (or 30s) is wound on the inner diameter side of the slant salient pole portion 78. Each of the coils 28n, 28s, 30n, and 30s may be wound around the core element 54 or 56 before coupling the core elements 54 and 56 with a coupling pin 86, or may be wound around the core element 54 or 56 after coupling with the coupling pin 86 and before assembling the shaft 25.

In the example illustrated in FIGS. 7 and 8, the slant projection portions 78 of the first and second core elements 54 and 56 adjacent to each other in the circumferential direction are coupled with the coupling pin 86. Specifically, as the slant projection portion 78 of the first core element 54 and the slant projection portion 78 of the second core element 56 are shifted from each other in the axial direction, these slant projection portions 78 can be aligned in an annular shape without interfering with each other when the core elements 54 and 56 are arranged in an annular shape.

Accordingly, in a state in which the pin hole 85 of the slant projection portion 78 of the first core element 54 and the pin hole 85 of the slant projection portion 78 of the second core element 56 are aligned in a single straight line along the axial direction, by inserting the coupling pin 86 through or press fitting the coupling pin 86 into the pin holes 85, it is possible to couple the first and second core elements 54 and 56 arranged in an annular shape.

In this case, as forming a magnetic flux path including an axial direction path via the auxiliary salient poles 42 formed by the slant projection portions 78 and the coupling pin 86 causes a reduction in the torque output due to a leak of the magnetic flux, it is preferable to form a space in the axial direction between the auxiliary salient pole 42 (i.e. the slant projection portion 78) of the first core element 54 and the auxiliary salient pole 42 (i.e. the slant projection portion 78) of the second core element 56 and/or use a coupling pin 86 made of a non-magnetic material such as stainless steel.

The shaft 25 is then inserted or press fit in the axial direction for assembling such that the outward projection portions 46 of the shaft 25 engage the inward recess portions 70 of the first and second core elements 54 and 56 that are coupled in an annular shape as described above. Further, as illustrated in FIG. 8, a plurality of looseness reduction pins 88 are inserted or press fit in the axial direction into a plurality of pin engaging portions 87 so as to push out the rotor side base portions 62 of the adjacent core elements 54 and 56. Thus, a looseness in assembling can be reduced between the core elements 54 and 56 that are adjacent and in firm contact with each other in the circumferential direction in the rotor side base portions 62 provided on the connection side with respect to the shaft 25.

With the rotor 14 according to the present embodiment described above, in which a plurality of core elements 54 and 56 arranged at a plurality of locations in the circumferential direction are provided in contact with each other in the rotor side base portion 62, the magnetic path through which a great amount of magnetic flux generated in the stator 12 passes does not pass through the shaft 25, so that an increase in the magnetic resistance can be prevented, thereby achieving enhancement of the performance of the rotating electrical machine 10.

While, in the above example, the rotor structure in which the induction coils 28n and 28s and the common coils 30n and 30s are wound around the N-pole forming salient pole 32n and S-pole forming salient pole 32s, and the induction coils 28n and 28s and the common coils 30n and 30s of the salient poles 32n and 32s, which are adjacent to each other in the circumferential direction, are connected with each other via the two diodes 38 and 40, has been described, the rotating electrical machine of the present invention is not limited to such a structure. For example, a structure of a rotor 14a illustrated in FIG. 9 in which the coils 30 are wound independently around the salient poles 32n and 32s, respectively, and the diode 38 or 40 is connected in series with each coil 30 may also be adopted. In this case, it is not necessary to provide the auxiliary salient poles 42 described above on each of the salient poles 32n and 32s.

Figure 9:
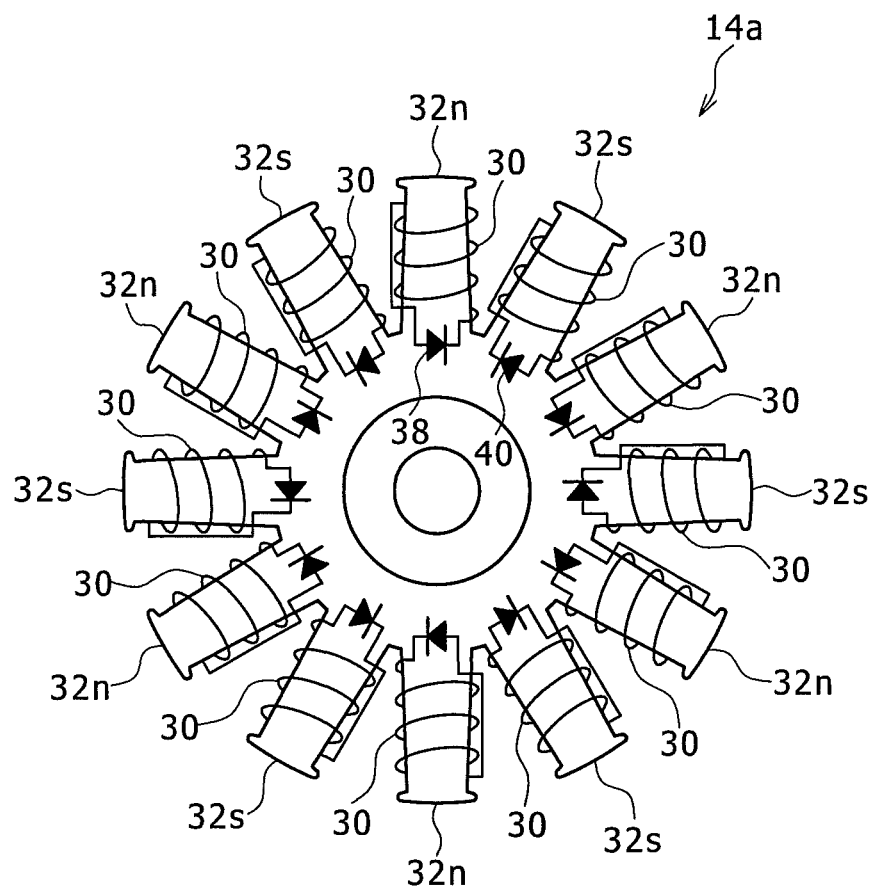
FIG. 9 View illustrating a modification example in which a diode is connected to each of the rotor coils wound around the salient poles of the rotor.
Figure 10:
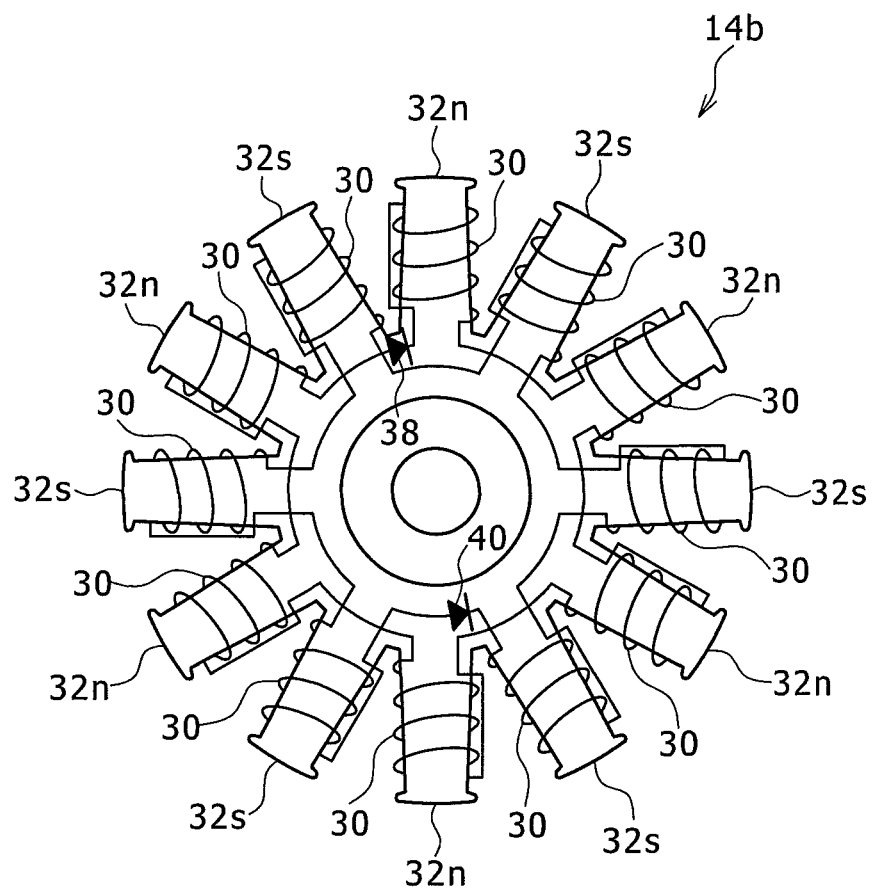
FIG. 10 View corresponding to FIG. 9 illustrating an example in which the number of diodes connected to the rotor coils is reduced.

Further, as in a rotor 14b illustrated in FIG. 10, the number of diodes that are used can be reduced compared to the rotor structure illustrated in FIG. 9. More specifically, while the rotor 14b is the same as the rotor 14a in that the coils 30 are wound independently around the N-pole forming salient pole 32n and S-pole forming salient pole 32s, respectively, in the rotor 14b, every other coil 30 in the circumferential direction may be connected in series with each other and connected to one diode 38, while the remaining coils 30 may be connected in series with each other and connected to one diode 40 having a forward direction which is opposite to that of the diode 38. With this structure, it is possible to reduce the number of diodes that are used from a number corresponding to the number of salient poles 32n and 32s to two.

The rotors 14a and 14b illustrated in FIGS. 9 and 10 may be formed by laminating and clamping electromagnetic steel plates, which are die-cut in an annular shape, in the axial direction and coupling the plates integrally by means of welding and other methods, rather than coupling a plurality of divided core elements 54 and 56 in the circumferential direction. In this case, the position in the circumferential direction of the rotor core fixed to the shaft can be determined by key fit, pressure fit, interference fit, and so on.

Figure 11:
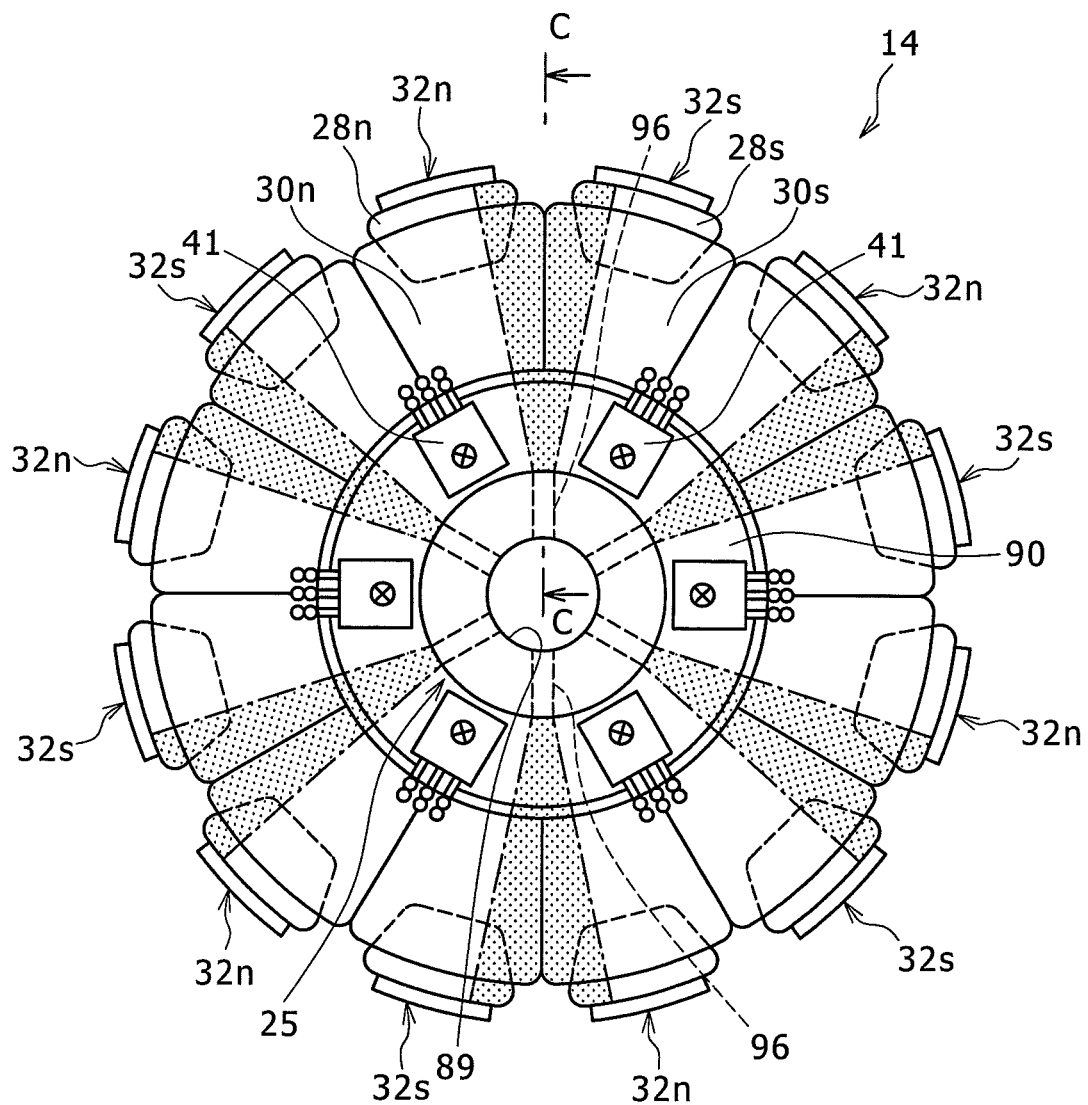
FIG. 11 View illustrating an end surface of the rotor in the axial direction.
Figure 12:
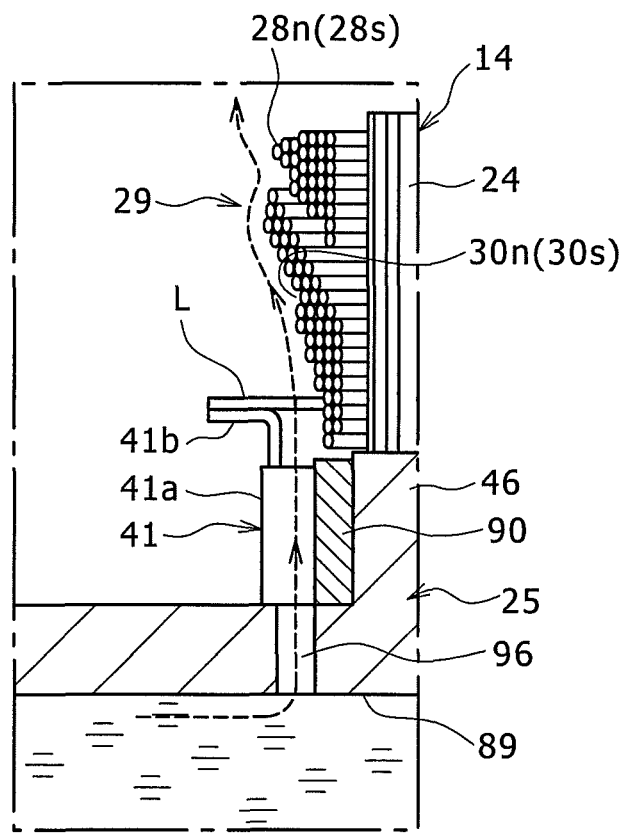
FIG. 12 Cross sectional view taken along line C-C in FIG. 11.
Figure 13:
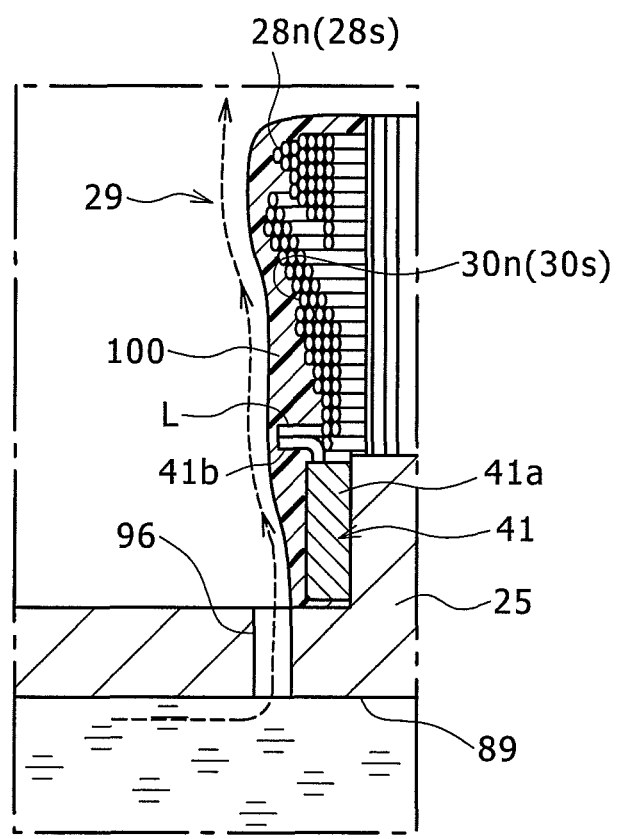
FIG. 13 View corresponding to FIG. 12 illustrating an example in which the diodes and the coil ends are covered with a mold resin.

With reference to FIGS. 11 to 13, in addition to FIG. 1, a cooling structure for a diode will be described. FIG. 11 is a view illustrating an end surface in the axial direction of the rotor 14; FIG. 12 is a cross sectional view taken along line C-C in FIG. 11; and FIG. 13 is a view corresponding to FIG. 12, which illustrates an example in which a diode and a coil end are covered with a mold resin. In the following description, the side closer to the rotor core 24 will be referred to as an "inward side in the axial direction" and the side further from the rotor core 24 will be referred to as an "outward side in the axial direction", and this will also be applied to the specification and the claims of the present application as a whole.

As illustrated in FIG. 1, the rotor 14 includes the shaft 25 which is rotatably supported on both end sides, and the rotor core 24 fitted and fixed around the shaft 25 by clamping, shrink fit, pressure fit, or other methods. The induction coils 28n and 28s and the common coils 30n and 30s are wound around the salient poles 32n and 32s of the rotor core 24, respectively, as described above.

Referring to FIGS. 11 and 12, in each of the salient poles 32n and 32s, the common coils 30n and 30s are wound on the inner diameter side and the induction coils 28n and 28s are wound on the outer diameter side. Further, the common coils 30n and 30s are wound overlapping the outer circumference of the induction coils 28n and 28s. More specifically, the common coils 30n and 30s are provided so as to cover the outer side in the axial direction of the induction coils 28n and 28s in the coil end 29 projecting outward from the end surface in the axial direction of the rotor core 24.

Here, the induction coils 28n and 28s are not completely covered with the common coils 30n and 30s in the coil end 29, and are exposed at an outer diameter side portion. With this structure, the induction coils 28n and 28s are in contact with cooling oil, which is a liquid refrigerant and which will be described below, at this outer diameter side portion, so that the cooling performance with respect to the induction coils 28n and 28s can be ensured.

The rotor 14 includes a plurality of diode elements 41 provided thereon, each including the first and second diodes 38 and 40 integrally. In the present embodiment, six diode elements 41, for example, are arranged at intervals in the circumferential direction so as to each correspond to one set of N-pole forming salient pole 32n and S-pole forming salient pole 32s that are adjacent to each other in the circumferential direction. Each diode element 41 is connected with the induction coils 28n and 28s and the common coils 30n and 30s wound around one set of the salient poles 32n and 32s, as described above with reference to FIGS. 4 and 5.

More specifically, the diode element 41 includes a mold resin main body 41a storing the first and second diodes 38 and 40, and three terminal portions 41b projecting in a substantially L shape from the mold resin main body 41a. The three terminal portions 41b of the diode element 41 are connected with three lead lines L extending from each of end portions of one set of induction coils 28n and 28s and an end portion of the common coil 30n or 30s by clamping, soldering, or other method, for example. With this structure, the diode element 41 is electrically connected with each of the coils 28n, 28s, 30n, and 30s.

The diode element 41 is attached to an attachment board 90 which is an annular plate member, for example, by using screw, bonding, or other methods. The attachment board 90 is preferably formed of a metal plate having an excellent thermal conductivity. The attachment board 90 is fitted and fixed to the shaft 25 by clamping, interference fit, securing by bolt, or other methods, in contact with the end surface in the axial direction of the outer projection portion 46 of the shaft 25 (and the rotor yoke 33 of the rotor core 24). The diode element 41 is fixed to a surface of the attachment board 90 on the outer side in the axial direction. Thus, the diode element 41 is provided so as to rotate with the shaft 25 and the rotor core 24.

The diode element 41 attached on the outer surface in the axial direction of the attachment board 90 as described above is disposed in contact with or adjacent to the outer circumferential surface of the shaft 25. By providing the diode element 41 at a position on the inner diameter side close to the shaft 25, it is possible to reduce a centrifugal force acting on the diode element 41 at the time of high-speed rotation of the rotor 14, so that occurrence of faults including malfunction and removal off of the diode element 41 toward the outer side in the radial direction caused by action of an intensive centrifugal force can be suppressed.

Further, the diode element 41 is provided on the inner diameter side with respect to the coils 28n, 28s, 30n, and 30s wound around the salient poles 32n and 32s of the rotor core 24. Thus, the rotor 14 is configured such that the diode element 41, the coils 28n, 28s, 30n, and 30s are sequentially cooled in this order by cooling oil supplied from the shaft 25, as will be described below.

While, in the present embodiment, an example in which all of the diode elements 41 are provided on one end side in the axial direction of the rotor core 24 has been described, the present invention is not limited to this structure, and a part of the diode elements 41 may be attached to the other end side in the axial direction of the rotor core 24. More specifically, three of the six diode elements 41 illustrated in FIG. 11 may be provided on the other end side in the axial direction of the rotor core 24.

First and second diodes 38 and 40 which are individually packaged may also be used. In this case, the first diode 38 may be provided on one end portion of the rotor core 24 and the second diode 40 may be provided on the other end portion of the rotor core 24.

Further, a gap or a heat insulation layer may be formed between the attachment board 90 and the rotor core 24 to thereby thermally separate the diode element 41 and the rotor core 24 (i.e. the coils 28n, 28s, 30n, and 30s). This structure provides an advantage that transmission of heat from the rotor core 24 to the diode element 41 via the attachment board 90 can be suppressed. In this case, the cooling oil may be supplied from the shaft 25 to the gap between the attachment board 90 and the rotor core 24 to thereby cool both the diode element 41 attached to the attachment board 90 and the coils 28n, 28s, 30n, and 30s wound around the rotor core 24.

Referring to FIGS. 1 and 11, a refrigerant channel 89 is provided within the shaft 25 so as to extend in the axial direction. The refrigerant channel 89 is configured such that cooling oil which is preferable as one example of liquid refrigerant is supplied from one end side of the shaft 25 in the axial direction. The cooling oil is supplied in a circulating manner to the refrigerant channel 89 of the shaft 25 through an oil cooler and an oil pump, which are not shown.

It is preferable that the liquid refrigerant flowing through the refrigerant channel 89 is supplied from one end side in the axial direction of the shaft 25 on which the diode element 41 is provided. With this structure, it is possible to use the liquid refrigerant in order to cool the diode element 41 in a state of a lower temperature than when the liquid refrigerant is supplied after passing through the shaft 25 located within the rotor core 24. Thus, the diode element 41 can be cooled sufficiently to reduce thermal damage and so on. Also, even when the supply amount of the cooling oil is reduced, the cooling performance with respect to the diode element 41 can be ensured.

Referring to FIGS. 11 and 12, the shaft 25 includes a plurality of refrigerant supply channels 96 formed therein. The refrigerant supply channel 96 is formed of a through-hole extending in the radial direction and has a function of supplying the cooling oil flowing within the refrigerant channel 89 outside the shaft. An opening portion of the refrigerant supply channel 96 which is opened to the outer circumferential surface of the shaft 25 is preferably provided corresponding to a location between the diode elements 41 with respect to the circumferential direction. In the present embodiment, an example in which six refrigerant supply channels 96 are formed between the diode elements 41 is illustrated. With the refrigerant supply channels 96 formed at such locations, the cooling oil discharged from the refrigerant supply channel 96 flows toward the outer side in the radiation direction while spreading in a substantially sector shape, as indicated by a dotted region in the drawing, by a centrifugal force of the rotating rotor 14, as will be described below, but is prevented from coming directly into contact with the diode element 41. As such, occurrence of disadvantages such as abrasion caused by contact or collision of the cooling oil flowing toward the outer side in the radial direction at a high speed with the diode element 41 by a centrifugal force can be suppressed.

As illustrated in FIG. 12, the refrigerant supply channel 96 formed in the shaft 25 is preferably formed to open substantially flush, in the axial direction, with the outer surface of the attachment board 90 on which the diode element 41 is attached. This structure enables the cooling oil discharged from the refrigerant supply channel 96 to flow reliably toward the outer side in the radial direction while being in contact with the outer surface of the attachment board 90. It is thus possible to effectively cool the diode element 41 by the cooling oil via the attachment board 90.

A cooling operation of the rotating electrical machine 10 including the rotor 14 having the center-through cooling structure as described above will be described.

The cooling oil supplied to the refrigerant channel 89 from one end portion in the axial direction of the shaft 25 flows in the axial direction, and upon reaching the position where the refrigerant supply channel 96 is formed, by means of a centrifugal force caused by the rotation of the rotor 14, or, if the cooling oil is pumped, in combination with a hydraulic pressure, is supplied outside the shaft 25 via the refrigerant supply channel 96. The cooling oil discharged from the refrigerant supply channel 96 outside the shaft 25 flows toward the outer side in the radial direction on the outer surface of the attachment board 90 located between the diode elements 41 while spreading in the circumferential direction in a substantially fan shape.

On the other hand, the diode element 41 including the first and second diodes 38 and 40 generates heat by allowing induced current generated by the induction coils 28n and 28s to flow therein. The heat thus generated transmits from the bottom surface (i.e. a surface contacting the attachment board 90) of the diode element 41 to the attachment board 90 and is absorbed in the cooling oil flowing on the outer surface of the attachment board 90 as described above. In other words, the diode element 41 is indirectly cooled by the cooling oil via the attachment board 90.

The cooling oil further flows toward the outward side in the radial direction while spreading in a substantially fan shape in the circumferential direction, and at the coil end comes into contact with the common coils 30n and 30s and the induction coils 28n and 28s to thereby cool each of the coils 28n, 28s, 30n, and 30s by the cooling oil. The heat resistance temperature of each of the coils 28n, 28s, 30n, and 30s (e.g. 160° C.) is higher than the heat resistance temperature (e.g. 125° C.) of the diode element 41. It is therefore possible to use the cooling oil which has already cooled the diode element 41 indirectly via the attachment board 90 for effectively and sufficiently cooling the coils 28n, 28s, 30n, and 30s which tend to be higher temperature than the diode element 41.

At this time, as the common coils 30n and 30s are disposed toward the inner diameter side with respect to the induction coils 28n and 28s, the common coils 30n and 30s are cooled first, and the induction coils 28n and 28s are subsequently cooled. As the flow direction of the induced current flowing in the induction coils 28n and 28 is restricted to one direction by the first and second diodes 38 and 40 as described above with reference to FIGS. 4 and 5, whereas a total amount of induced current generated by a set of induced coils 28n and 28s flows in one set of common coils 30n and 30s connected in series with each other, the quantity of heat generated by the common coils 30n and 30s is greater than the quantity of heat generated by the induction coils 28n and 28s. Accordingly, by using the cooling oil supplied from the shaft 25 to cool the induction coils 28n and 28s located toward the outer diameter side after the common coils 30n and 30s located toward the inner diameter side are cooled, it is possible to make the cooling performance with respect to the common coils 30n and 30s superior to the cooling performance with respect to the induction coils 28n and 28s. This can result in an increase in the number of windings of the common coils 30n and 30s.

In the rotor 14 according to the present embodiment, as the common coils 30n and 30s are wound so as to overlap the outer circumference of the induction coils 28n and 28s, the cooling oil supplied from the shaft 25 comes into contact with the common coils 30n and 30s in a greater amount than with the induction coils 28n and 28s. This can make the cooling performance with respect to the common coils 30n and 30s further superior, so that it is possible to cool the common coils 30n and 30s sufficiently even when the number of windings of the common coils 30n and 30s is greater than that of the induction coils 28n and 28s.

The cooling oil that has cooled the common coils 30n and 30s and the induction coils 28n and 28s sequentially in this order at the coil end flows further towards the outward side in the radial direction by the centrifugal force of the rotating rotor 14 to the coil end of the stator coils 20u, 20v, and 20w of the stator 12 from the rotor 14. Thus, it is possible to efficiently cool the stator coils 20u, 20v, and 20w to which greater drive current is supplied externally of the rotating electrical machine 10 when compared to the coils 28n, 28s, 30n, and 30s of the rotor 14, by the cooling oil whose temperature has been increased by cooling the diode element 41 and the coils 28n, 28s, 30n, and 30s of the rotor 14.

Thereafter, the cooling oil which has cooled the stator coils 20u, 20v, and 20w flows downward and is stored in the bottom portion of a case housing the rotating electrical machine 10, is then drained through an outlet port, and passes through the oil cooler to thereby undergo heat dissipation and temperature drop. Subsequently, the cooling oil is supplied in a circulating manner to the refrigerant channel 89 within the shaft 25 by an action of the oil pump and so on.

As described above, in the rotating electrical machine 10 having the rotor 14 according to the present embodiment, the cooling oil supplied from the refrigerant supply channel 96 of the shaft 25 is used to first cool the diode element 41 and subsequently cool the coils 28n, 28s, 30n, and 30s having a higher heat resistance than the diode element 41. It is therefore possible to effectively cool both the diode element 41 and the coils 28n, 28s, 30n, and 30s by the cooling oil supplied from the shaft 25. Further, while, when the coils 28n, 28s, 30n, and 30s are cooled first, there is a possibility of malfunction caused by heating the diode element 41 with the cooling oil whose temperature has been increased by the heat of the coils 28n, 28s, 30n, and 30s, but with the present embodiment, such a possibility can be prevented.

In addition, according to the rotating electrical machine 10 including the rotor 14 of the present embodiment, as the diode element 41 is disposed toward the inner diameter side, it is possible to prevent the diode element 41 from being removed due to the centrifugal force at the time of rotation of the rotor, and also to cool the diode element 41 effectively with the cooling oil flowing toward the outward side in the radial direction due to the centrifugal force.

While an embodiment of the present invention and the modification examples thereof have been described above, the present invention is not limited to these examples and various modifications and improvements can be made.

For example, in the above example, in order to prevent the cooling oil to be supplied from the refrigerant supply channel 96 of the shaft 25 from coming into direct contact with the diode element 41, the opening portion of the refrigerant supply channel 96 is formed at a location corresponding to a location between the diode elements 14 with respect to the circumferential direction. In addition to or in place of this structure, a structure in which the diode element 41 and the coils 28n, 28s, 30n, and 30s are covered with a mold resin portion 100 and an opening portion of the refrigerant supply channel 96 is formed on the shaft 25 which is located on the inward side in the radial direction of the diode element 41, as illustrated in FIG. 13, may be adopted. In this case, as the cooling oil discharged from the refrigerant supply channel 96 flows over the mold resin portion 100 covering the diode element 41, it is possible to sufficiently cool the diode element 41. Also, as the cooling oil is not in direct contact with the diode element 41, it is possible to prevent occurrence of problems such as abrasion and deterioration of the diode element 41 caused by allowing the cooling oil flowing at a high rate toward the outward side in the radial direction due to the action of the centrifugal force to come into contact with or impact the diode element 41.

It is also possible to fix the diode element 41 directly on at least one of the end surface in the axial direction of the outward projection portion 46 of the shaft 25 and the rotor yoke 33 of the rotor core 24, thereby omitting the attachment board 90. This structure can achieve an advantage of reducing the number of components and cost.

Further, while in the above embodiments the diode element 41 or a rectifier, which is a separate member, is attached to the attachment board 90 which is provided at the end portion of the rotor core 24 with a screw or the like, the present invention is not limited to this structure. For example, a diode made of a semiconductor element may be formed integrally with or included in an attachment board.

While in the above embodiments a structure in which the diode element 41 attached on the attachment board 90 is cooled by the cooling oil supplied through the refrigerant supply channel 96 of the shaft 25 is described, the present invention is not limited to this structure. For example, a structure in which an end plate covering the coils 28n, 28s, 30n, and 30s wound around the rotor core 24 is provided on the end surface in the axial direction of the rotor core, a diode element is fixed on this end plate, and cooling oil supplied from the shaft or a non-rotation portion is used to first cool the diode element 41 provided on the inner diameter side via the end plate and then cool the coils on the outer diameter side, may also be adopted, for example.

REFERENCE SYMBOLS LIST 10 rotating electrical machine, 12 stator, 14, 14a, 14b rotor, 16 stator core, 18 teeth, 20u, 20v, 20w stator coil 22 slot, 24 rotor core, 25 shaft, 26a, 26b end plate, 28n N-pole induction coil, 28s S-pole induction coil, 30n N-pole common coil, 30s S-pole common coil, 32n N-pole forming salient pole, 32s S-pole forming salient pole, 33 rotor yoke, 34 slot, 36 common coil set, 38 first diode, 40 second diode, 41 diode element, 42 auxiliary salient pole, 44 flange portion, 46 outward projection portion, 48 shaft side base portion, 50 shaft side tip portion, 52 maximum width portion, 54 first core element, 56 second core element, 62 rotor side base portion, 64 rotor side tip portion, 70 inward recess portion, 72 wide width portion, 74 semicircle portion, 78 slant projection portion, 80 circumferential direction projection portion, 85 pin hole, 86 coupling pin, 87 pin engaging portion, 88 looseness reduction pin, 89 refrigerant channel, 90 attachment board, 96 refrigerant supply channel, 100 mold resin portion

The invention claimed is:

1. A rotor for a rotating electrical machine, the rotor comprising:
    a shaft supported in a rotatable manner;
    a rotor core secured to the shaft;
    an attachment board fixed to the shaft so as to rotate along with the shaft and the rotor core;
    an electronic device fixed on a surface of the attachment board on an outer side in the axial direction of the rotor;
    a coil wound around the rotor core and connected to the electronic device and having a higher heat resistance temperature than a heat resistance temperature of the electronic device; and
    a cooling structure configured to first cool the electronic device disposed on an inner diameter side with respect to the coil and subsequently cool the coil with a liquid refrigerant supplied from a refrigerant supply channel configured to supply the liquid refrigerant flowing in the shaft to the outside of the shaft,
    wherein the electronic device and a coil end of the coil which are cooled by the liquid refrigerant supplied from the refrigerant supply channel are aligned in a radial direction at an axial position of the refrigerant supply channel in an axial direction of the rotor, and
    wherein the electronic device is indirectly cooled by the liquid refrigerant via the attachment board or via a mold resin portion provided to cover the electronic device.

2. The rotor for a rotating electrical machine according to claim 1, wherein
    the rotor core includes a plurality of salient poles in an outer circumferential portion thereof, and
    coil includes a common coil wound on an inner diameter side of the salient pole with respect to a radial direction of the rotor core for magnetizing the salient pole, and an induction coil wound on an outer diameter side of the salient pole and also connected to the common coil for generating induced current in response to a change in a magnetic flux from a stator.

3. The rotor for a rotating electrical machine according to claim 2, wherein
    the common coil is wound around an outer circumference of the induction coil so as to partially overlap the induction coil so that the induction coil is exposed at an outer diameter side portion.

4. The rotor for a rotating electrical machine according to claim 1, wherein,
    the electronic device is disposed on one end surface in the axial direction of the rotor core; and
    the liquid refrigerant flowing in a refrigerant channel within the shaft is supplied from one end portion side in the axial direction of the shaft on which the electronic device is disposed.

5. A rotating electrical machine, comprising:
    the rotor for a rotating electrical machine according to claim 1; and
    a stator disposed opposite the rotor to cause a rotating magnetic field to act on the rotor.

* * * * *